United States Patent
Chang et al.

(10) Patent No.: US 9,191,973 B2
(45) Date of Patent: Nov. 17, 2015

(54) METHOD OF HANDLING RANDOM ACCESS CHANNEL PROCEDURE AND RELATED COMMUNICATION DEVICE

(71) Applicant: HTC Corporation, Taoyuan County (TW)

(72) Inventors: Po-Yu Chang, Taoyuan County (TW); Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 228 days.

(21) Appl. No.: 13/959,700

(22) Filed: Aug. 5, 2013

(65) Prior Publication Data
US 2014/0036817 A1  Feb. 6, 2014

Related U.S. Application Data (60) Provisional application No. 61/679,798, filed on Aug. 6, 2012, provisional application No. 61/681,148, filed on Aug. 9, 2012.

(51) Int. Cl.
*H04W 74/08* (2009.01)
*H04W 72/04* (2009.01)
*H04W 74/00* (2009.01)

(52) U.S. Cl.
CPC ...... *H04W 74/0833* (2013.01); *H04W 72/0446* (2013.01); *H04W 74/006* (2013.01)

(58) Field of Classification Search
CPC .............. H04W 24/10; H04W 56/001; H04W 56/0045; H04W 56/0005; H04W 72/042; H04W 72/0486; H04W 72/0446; H04W 74/006; H04W 74/0833; H04W 88/08
USPC ........ 370/252, 329–336; 455/414.1, 450, 500
See application file for complete search history.

(56) References Cited

U.S. PATENT DOCUMENTS

| | | | |
|---|---|---|---|
| 8,457,049 B2* | 6/2013 | Somasundaram et al. ..... 370/328 |
| 8,964,590 B2* | 2/2015 | Dinan ........................... 370/252 |
| 2007/0254656 A1* | 11/2007 | Dalsgaard .................. 455/435.1 |
| 2009/0186613 A1* | 7/2009 | Ahn et al. ...................... 455/434 |
| 2013/0242730 A1* | 9/2013 | Pelletier et al. ............... 370/230 |
| 2013/0250925 A1* | 9/2013 | Lohr et al. .................... 370/336 |
| 2013/0301439 A1* | 11/2013 | Heo et al. ...................... 370/252 |
| 2015/0049739 A1* | 2/2015 | Lee et al. ...................... 370/336 |
| 2015/0071260 A1* | 3/2015 | Chun et al. .................... 370/336 |
| 2015/0131630 A1* | 5/2015 | Dinan ........................... 370/336 |

FOREIGN PATENT DOCUMENTS

WO  WO 2009088858 A1 *  7/2009

* cited by examiner

*Primary Examiner* — Afsar M Qureshi
(74) *Attorney, Agent, or Firm* — Winston Hsu; Scott Margo (57) ABSTRACT

A method of handling random access channel (RACH) procedures for a network in a wireless communication system includes sending a first information request message to a user equipment of the wireless communication system for receiving a first RACH report of a first RACH procedure from the user equipment after detecting that the user equipment has completed the first RACH procedure successfully on a primary cell of the network.

13 Claims, 5 Drawing Sheets

METHOD OF HANDLING RANDOM ACCESS CHANNEL PROCEDURE AND RELATED COMMUNICATION DEVICE

CROSS REFERENCE TO RELATED APPLICATIONS

This application claims the benefit of U.S. Provisional Application No. 61/679,798, filed on Aug. 6, 2012 and entitled "Method of Handle RACH SON", and U.S. Provisional Application No. 61/681,148, filed on Aug. 9, 2012 and entitled "Method of optimization RACH configuration of PCell and SCell", the contents of which are incorporated herein in their entirety.

BACKGROUND OF THE INVENTION

1. Field of the Invention

The present invention relates to a method used in a wireless communications system and related communication device, and more particularly, to a method of handling random access channel (RACH) procedures in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), a serving gateway, etc. for NAS (Non Access Stratum) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc.

For bandwidth extension, the carrier aggregation (CA) technology is introduced to the LTE-A system by which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8.

When the UE is configured with the CA, the UE is allowed to receive and transmit data on one or multiple component carriers to increase the data throughput. In the LTE-A system, the component carriers configured to the UE have to consist of one downlink primary component carrier (DL PCC) and one uplink primary component carrier (UL PCC). Component carriers other than the primary component carriers are named UL or DL secondary component carriers (SCCs). A cell operating on the primary component carriers is known as a primary cell (PCell), which handles radio resource control (RRC) connection establishment/re-establishment/handover. A cell operating on the secondary component carrier is known as a secondary cell (SCell), which may be configured after an RRC connection is established in order to provide additional radio resources. The PCell (i.e. the UL and DL PCCs) is always activated, whereas the SCell may be activated or deactivated according to specific conditions (e.g. an amount of data for transmission).

A random access channel (RACH) procedure is performed by a UE to acquire uplink (UL) synchronization. The UE performs the RACH procedure by transmitting random access preamble(s) to the target eNB, receiving a corresponding random access response from the target eNB, and validating a preamble number included in the random access response. Accordingly, the UE transmits a resource request or a handover complete to the target eNB using resources indicated in the random access response. After a grant corresponding to the resource request or the handover complete is received from the target eNB, the UE is able to transmit and receive data. Therefore, it is important for the UE to complete the RACH procedure.

In the LTE-A system, the UE is allowed to perform a network initiated RACH procedure on the SCell. For example, the eNB may configure a new serving cell (i.e., a SCell) to the UE to improve data throughput and activate the SCell by sending a media access control (MAC) control element (CE). In order for the UE to obtain uplink synchronization of the SCell, the eNB may then send a physical downlink control channel (PDCCH) order to the UE to trigger a RACH procedure on the SCell.

The eNB may send an information request message to the UE for obtaining a RACH report, so as to help the eNB to optimize RACH configurations of the succeeding RACH procedure. The RACH report may include a parameter to represent the amount of random access preambles which have been sent by the UE for the last successfully completed RACH procedure, thereby the eNB can optimize the RACH configurations accordingly. Since the UE is allowed to perform a network initiated RACH procedure on the SCell, the last serving cell on which the UE completed the RACH procedure successfully could be a SCell. However, the SCell may have been de-configured or deactivated when the UE receives the information request message from the eNB, and therefore the amount of random access preambles included in the RACH report may be obsolete or futile for the optimization. In the worst case, reporting such information may mislead the eNB to perform a wrong optimization for the RACH procedure on the PCell.

Thus, how to improve the performance of the RACH procedures for the CA technology is a topic to be addressed and discussed in the industry.

SUMMARY OF THE INVENTION

The present invention therefore provides a method and related communication device for handling random access channel (RACH) procedures, so as to improve the performance of the RACH procedures for the CA technology.

The present invention discloses a method of handling random access channel (RACH) procedures for a network in a wireless communication system. The method includes sending a first information request message to a user equipment of the wireless communication system for receiving a first RACH report of a first RACH procedure from the user equipment after detecting that the user equipment has completed the first RACH procedure successfully on a primary cell of the network.

The present invention further discloses a method of handling random access channel (RACH) procedures for a user equipment in a wireless communication system, wherein the user equipment is allowed to perform at least one first RACH procedure on a secondary cell of a network in the wireless communication system. The method includes reporting a first number to the network to indicate the amount of random access preambles which have been sent for a last successfully completed second RACH procedure on a primary cell of the network; and reporting a second number to the network to indicate the amount of random access preambles which have been sent for the last successfully completed first RACH procedure on the secondary cell of the network.

The present invention further discloses a method of handling random access channel (RACH) procedures for a user equipment in a wireless communication system, wherein the user equipment has performed at least one first RACH procedure on a secondary cell of a network of the wireless communication system. The method includes reporting a number to the network to indicate the amount of random access preambles which have been sent for a last successfully completed second RACH procedure on a primary cell of the network.

The present invention further discloses a method of handling random access channel (RACH) procedures for a user equipment in a wireless communication system, wherein the user equipment has performed at least one RACH procedure on a secondary cell of a network of the wireless communication system. The method includes not reporting a number to the network to indicate the amount of random access preambles which have been sent for the last successfully completed RACH procedure if the last successfully completed RACH procedure is performed by the UE on the secondary cell of the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
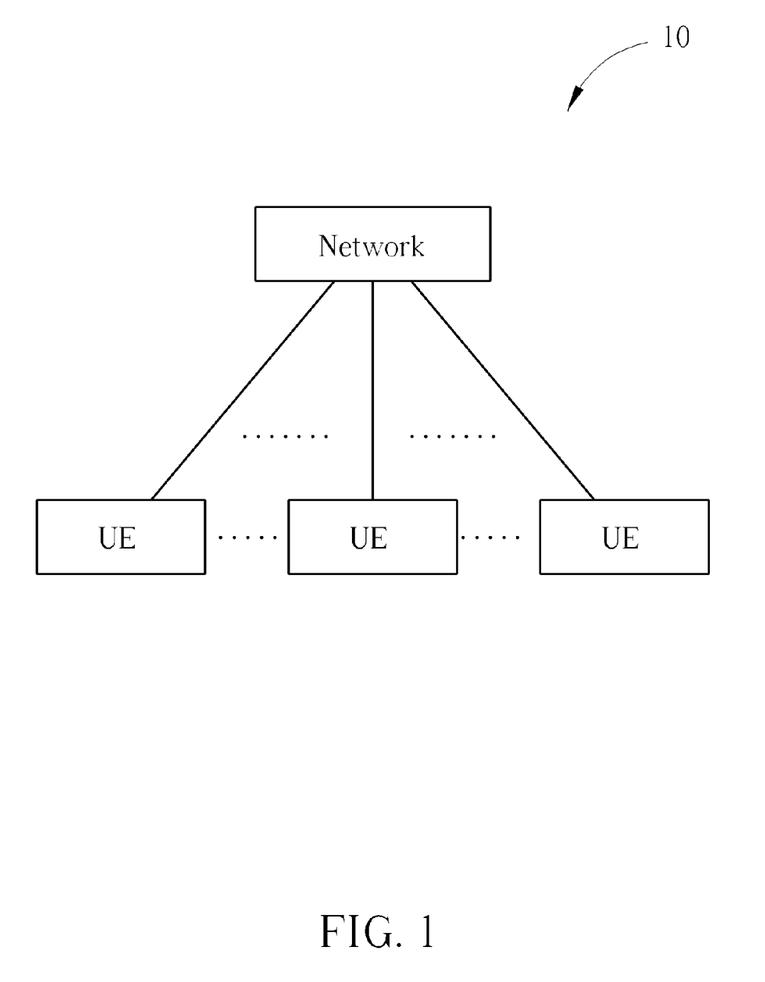
FIG. 1 is a schematic diagram of a wireless communications system according to an example of the present invention.

Please refer to FIG. 1, which is a schematic diagram of a wireless communication system 10 according to an example of the present invention. The wireless communication system 10, such as a long term evolution-advanced (LTE-A) system or other mobile communication systems supporting carrier aggregation, is briefly composed of a network and a plurality of user equipments (UEs). In FIG. 1, the network and the UEs are simply utilized for illustrating the structure of the wireless communication system 10. Practically, the network can be referred as to an E-UTRAN (evolved-UTAN) comprising a plurality of evolved Node-Bs (eNBs) and relays in the LTE-A system. The UEs can be devices such as mobile phones, laptops, tablet computers, electronic books, and portable computer systems. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
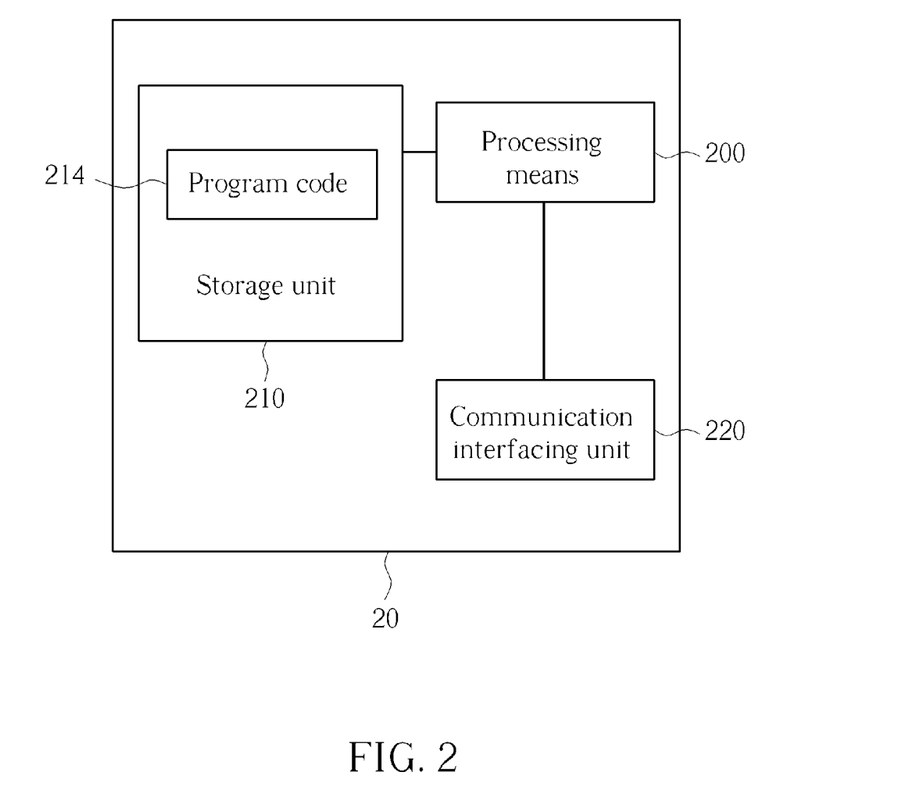
FIG. 2 is a schematic diagram of a communication device according to an example of the present invention.

Please refer to FIG. 2, which is a schematic diagram of a communication device 20 according to an example of the present invention. The communication device 20 can be the UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can transmit and receive wireless signals (e.g., messages or packets) according to processing results of the processing means 200.

Figure 3:
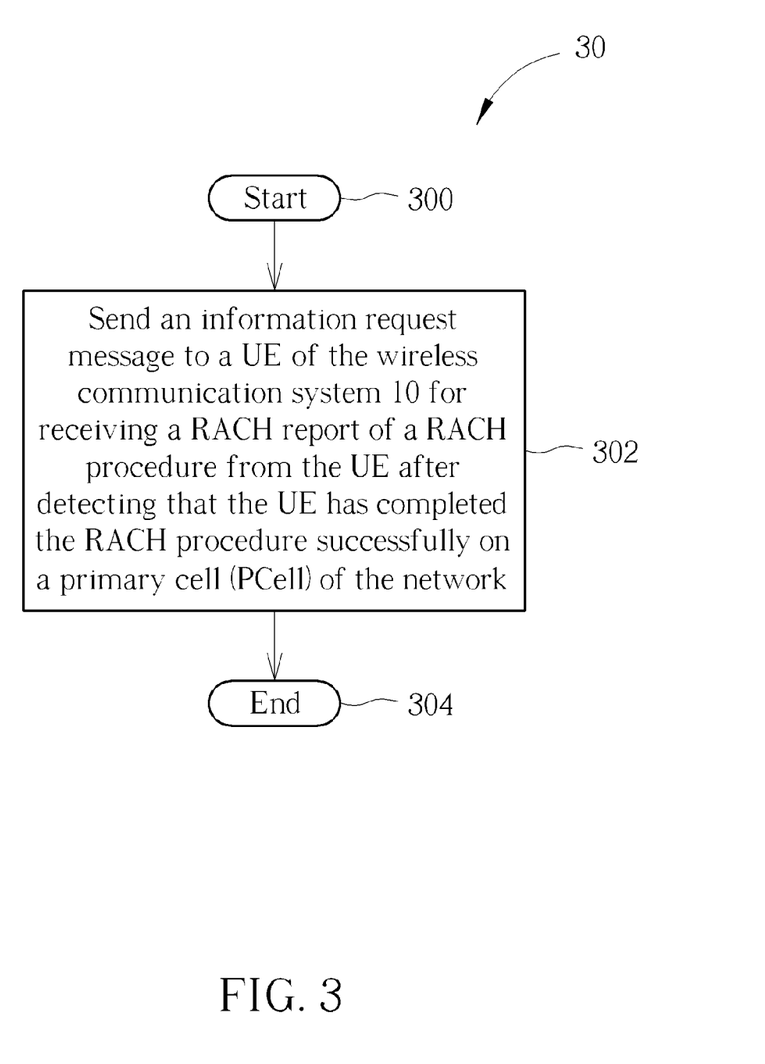
FIG. 3 is a flowchart of a process according to an example of the present invention.

Please refer to FIG. 3, which is a flowchart of a process 30 according to an example of the present invention. The process 30 is utilized for a network to handle random access channel (RACH) procedures in the wireless communication system 10 shown in FIG. 1. The process 30 may be realized by the network through, for example, a serving point (i.e., a serving cell), a switching center such as a mobility management entity (MME) or a radio network controller (RNC), and is not limited herein. The process 30 is implemented by the communication device 20 and may be compiled into the program code 214 to instruct the processing means 200 to execute the following steps:

Step 300: Start.

Step 302: Send an information request message to a UE of the wireless communication system 10 for receiving a RACH report of a RACH procedure from the UE after detecting that the UE has completed the RACH procedure successfully on a primary cell (PCell) of the network.

Step 304: End.

According to the process 30, the network may detect if the UE has successfully completes a RACH procedure on a PCell. Once the network detects a RACH procedure is successfully completed by the UE, the network requests the UE to report an information (e.g., an information response message) containing the RACH report of the RACH procedure that just happened. Accordingly, the network may optimize a RACH configuration of the PCell according to the RACH report received from the UE.

In short, the network needs to send the information request message to the UE as soon as it detects a completion of a RACH procedure on the UE, so as to obtain the most updated RACH report and optimize the RACH configuration effectively in order to improve the performance of the succeeding RACH procedures.

Note that, the process 30 is an example of the present invention. Those skilled in the art should readily make combinations, modifications and/or alterations on the abovementioned description and examples. In an embodiment, the network may also send an information request message to a UE of the wireless communication system 10 for receiving a RACH report of a RACH procedure from the UE after detecting that the UE has completed the RACH procedure successfully on a secondary cell (SCell) of the network. The network may optimize RACH configurations of the PCell and the SCell independently according to different RACH reports received from the UE or other UEs. Namely, the network may optimize a RACH configuration of the PCell according to at least one RACH report of a RACH procedure performed on the PCell, and the network may optimize a RACH configuration of the SCell according to at least one RACH report of the RACH procedure performed on the SCell. The at least one RACH report of the RACH procedure performed on the PCell comprises a plurality of RACH reports of a plurality of RACH procedures performed on the PCell by a plurality of UEs. The at least one RACH report of the RACH procedure performed on the SCell comprises a plurality of RACH reports of a plurality of RACH procedures performed on the SCell by a plurality of UEs.

Figure 4:
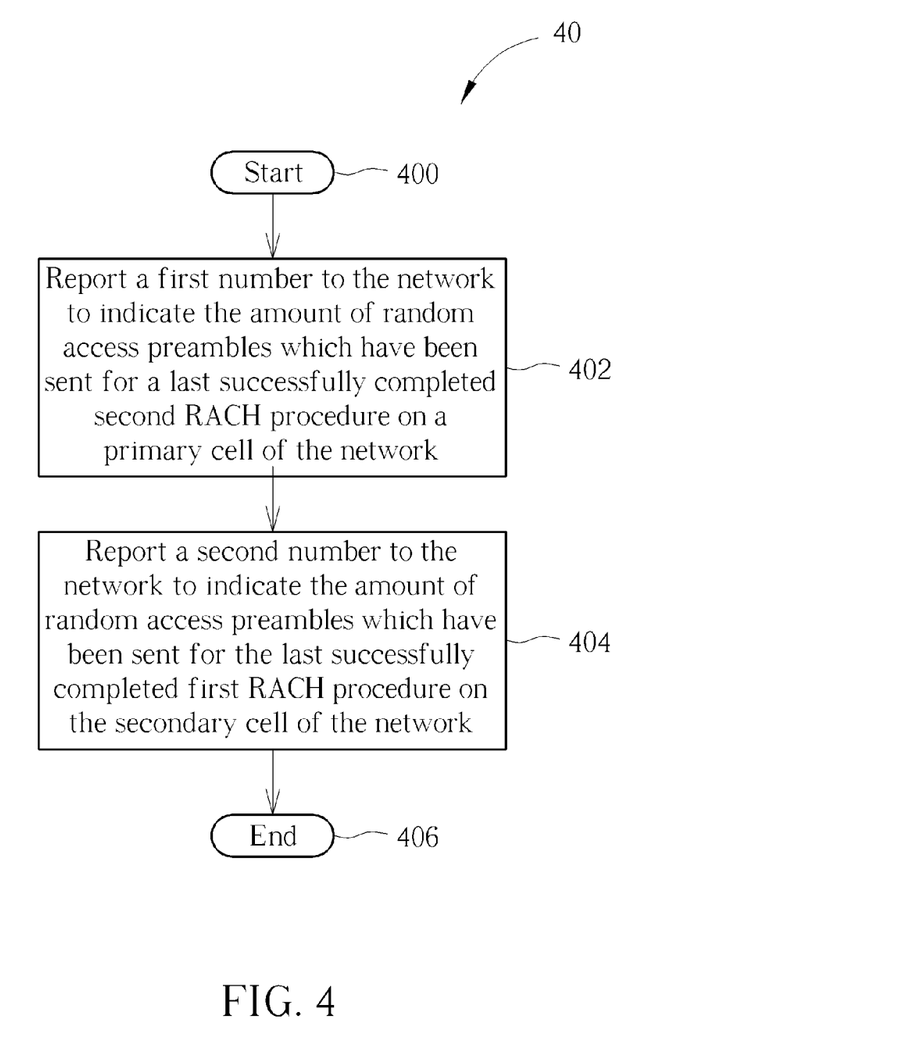
FIG. 4 is a flowchart of a process according to an example of the present invention.

On the other hand, the UE may send RACH reports corresponding to both the PCell and the SCell. Please refer to FIG. 4, which is a flowchart of a process 40 according to an example of the present invention. The process 40 is utilized for a UE to handle RACH procedures in the wireless communication system 10 shown in FIG. 1, wherein the UE is allowed to perform at least one first RACH procedure on a SCell of a network in the wireless communication system 10. The process 40 is implemented by the communication device 20 and may be compiled into the program code 214 to instruct the processing means 200 to execute the following steps:

Step 400: Start.

Step 402: Report a first number to the network to indicate the amount of random access preambles which have been sent for a last successfully completed second RACH procedure on a primary cell of the network.

Step 404: Report a second number to the network to indicate the amount of random access preambles which have been sent for the last successfully completed first RACH procedure on the secondary cell of the network.

Step 406: End.

According to the process 40, the UE respectively sends RACH reports containing information about the amounts of random access preambles which have been sent for the last successfully completed RACH procedures on the PCell and on the SCell to the network. Accordingly, the network may perform the optimization for the RACH procedures on the PCell and on the SCell accurately according to the information in the RACH reports.

Since the UE is allowed to perform a RACH procedure on the SCell and the SCell is not always activated, the SCell may have been de-configured or deactivated when the UE needs to send the RACH report(s) to the network. In this embodiment, the UE sends both the RACH report corresponding to the PCell and the RACH report corresponding to the SCell. Therefore, even if the UE had just completed the RACH procedure on the SCell and the succeeding RACH procedures are no longer on the SCell because the SCell has been de-configured or deactivated, the network may still obtain the correct information to optimize the RACH configurations for the succeeding RACH procedures on the PCell.

Note that the process 40 is an example of the present invention. Those skilled in the art should readily make combinations, modifications and/or alterations on the abovementioned description and examples. In an embodiment, the UE may store the amount of random access preambles on the PCell and on the SCell in two variables, respectively. In detail, the UE may set a first counter to count the amount of random access preambles sent by a media access control (MAC) layer when trying to initiate a RACH procedure on the PCell cell. Then, the UE stores the value of the first counter in a first variable when successfully completing the RACH procedure on the PCell. When the UE needs to send the RACH report(s), the UE may report the number stored in the first variable to the network to indicate the amount of random access preambles which have been sent for the last successfully completed RACH procedure on the PCell. Similarly, the UE may set a second counter to count the amount of random access preambles sent by the MAC layer when trying to initiate a RACH procedure on the SCell, store the value of the second counter in a second variable when successfully completing the RACH procedure on the SCell, and report the number stored in the second variable to the network to indicate the amount of random access preambles which have been sent for the last successfully completed RACH procedure on the SCell.

In an embodiment, the UE may report the numbers indicating the amounts of random access preambles which have been sent for the last successfully completed RACH procedure on the PCell and on the SCell after receiving an information request message for a RACH report from the network. In addition, the UE may report the numbers in an information response message and transmit the information response message to the network.

Figure 5:
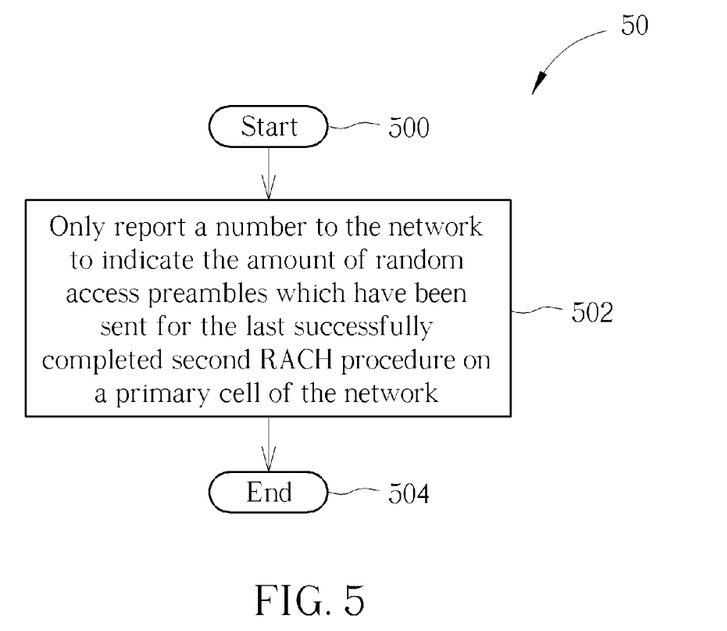
FIG. 5 is a flowchart of a process according to an example of the present invention.

Please refer to FIG. 5, which is a flowchart of a process 50 according to an example of the present invention. The process 50 is utilized for a UE to handle RACH procedures in the wireless communication system 10 shown in FIG. 1, wherein the UE has performed at least one first RACH procedure on a SCell of a network of the wireless communication system 10. The process 50 is implemented by the communication device 20 and may be compiled into the program code 214 to instruct the processing means 200 to execute the following steps:

Step 500: Start.

Step 502: Only report a number to the network to indicate the amount of random access preambles which have been sent for the last successfully completed second RACH procedure on a primary cell of the network.

Step 504: End.

According to the process 50, the UE reports a number which indicates the amount of random access preambles which have been sent for the last successfully completed RACH procedure on the PCell, even if the UE had just performed a RACH procedure on the SCell later than the last successfully completed RACH procedure on the PCell. In an embodiment, the UE may set a counter to count the amount of random access preambles sent by the MAC layer when trying to initiate a RACH procedure on the PCell, and store the value of the counter in a variable when successfully completing the RACH procedure on the PCell. When the UE needs to send a RACH report to the network, the UE may send the number stored in the variable that indicates the amount of random access preambles which have been sent for the last successfully completed RACH procedure on the PCell. The UE may report the number after receiving an information request message for a RACH report from the network. Besides, the number may be reported in an information response message transmitted by the UE.

Figure 6:
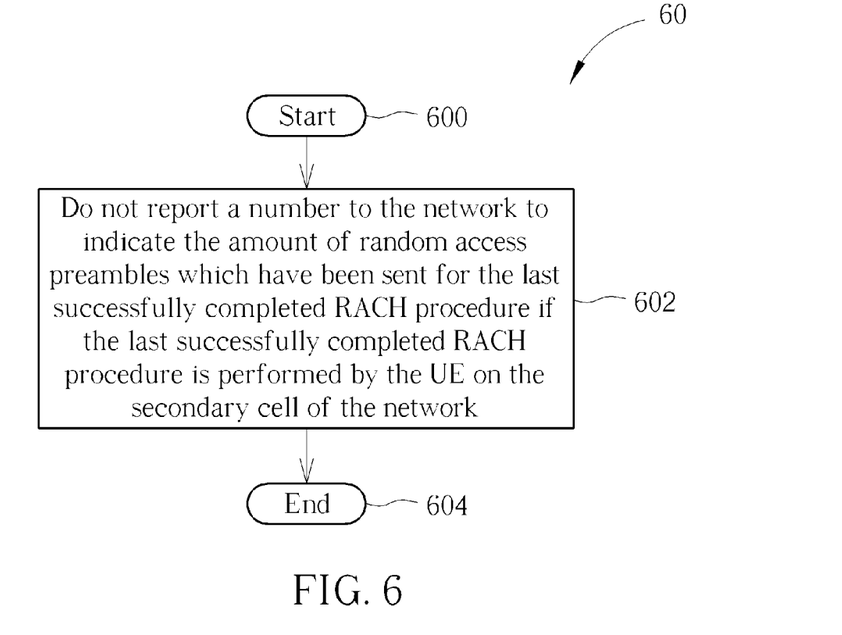
FIG. 6 is a flowchart of a process according to an example of the present invention.

Please refer to FIG. 6, which is a flowchart of a process 60 according to an example of the present invention. The process 60 is utilized for a UE to handle RACH procedures in the wireless communication system 10 shown in FIG. 1, wherein the UE has performed at least one RACH procedure on a SCell of a network of the wireless communication system 10. The process 60 is implemented by the communication device 20 and may be compiled into the program code 214 to instruct the processing means 200 to execute the following steps:

Step 600: Start.

Step 602: Do not report a number to the network to indicate the amount of random access preambles which have been sent for the last successfully completed RACH procedure on the secondary cell of the network.

Step 604: End.

According to the process 60, if the last successfully completed RACH procedure is performed by the UE on the SCell, the UE does not report the amount of random access preambles which have been sent for the last successfully completed RACH procedure. In an embodiment, if the network requests the UE (e.g., sends an information request message to the UE) to obtain a RACH report while the last successfully completed RACH procedure is performed on the SCell, the UE does not report the number indicating the amount of random access preambles which have been sent for the last successfully completed RACH procedure on the SCell. The UE may even ignore the request under such situation. Therefore, the network is not misled to perform a wrong optimization for the RACH procedure on the PCell using the information related to the SCell.

The abovementioned steps of the processes 30, 40, 50, and 60 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20.

To sum up, the present invention provides a method for handling RACH procedures by requiring the network to send an information request message to the UE for receiving a RACH report after the UE completes a RACH procedure. In addition, the UE may report the number(s) indicating the amount(s) of random access preambles sent for the last successfully completed RACH procedure(s) on both the PCell and the SCell, or on the PCell only. Alternatively, the UE may not report the number indicating the amount of random access preambles sent for the last successfully completed RACH procedure on the SCell. Thus, the network may not obtain obsolete or futile data for optimizing the RACH configurations, thereby improving the performance of the RACH procedures for the CA technology.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access channel (RACH) procedures for a network in a wireless communication system, the method comprising:
   sending a first information request message to a user equipment of the wireless communication system for receiving a first RACH report of a first RACH procedure from the user equipment after detecting that the user equipment has completed the first RACH procedure successfully on a primary cell of the network.

2. The method of claim 1, further comprising:
   optimizing a first RACH configuration of the primary cell according to the first RACH report of the first RACH procedure received from the user equipment.

3. The method of claim 1, further comprising:
   sending a second information request message to the user equipment for receiving a second RACH report of a second RACH procedure from the user equipment after detecting that the user equipment has completed the second RACH procedure successfully on a secondary cell of the network.

4. The method of claim 3, further comprising:
   optimizing a second RACH configuration of the secondary cell according to the second RACH report of the second RACH procedure received from the user equipment.

5. A method of handling random access channel (RACH) procedures for a user equipment in a wireless communication system, wherein the user equipment is allowed to perform at least one first RACH procedure on a secondary cell of a network in the wireless communication system, the method comprising:
   reporting a first number to the network to indicate the amount of random access preambles which have been sent for a last successfully completed second RACH procedure on a primary cell of the network; and
   reporting a second number to the network to indicate the amount of random access preambles which have been sent for the last successfully completed first RACH procedure on the secondary cell of the network.

6. The method of claim 5, wherein the step of reporting the first number to the network to indicate the amount of random access preambles which have been sent for the last successfully completed second RACH procedure on the primary cell of the network comprises:
   setting a first counter to count the amount of random access preambles sent by a media access control (MAC) layer when trying to initiate a second RACH procedure on the primary cell;
   storing a value of the first counter in a first variable when successfully completing the second RACH procedure on the primary cell of the network; and
   reporting the first number stored in the first variable to the network to indicate the amount of random access preambles which have been sent for the last successfully completed second RACH procedure on the primary cell of the network.

7. The method of claim 5, wherein the step of reporting the second number to the network to indicate the amount of random access preambles which have been sent for the last successfully completed first RACH procedure on the secondary cell of the network comprises:
   setting a second counter to count the amount of random access preambles sent by the media access control (MAC) layer when trying to initiate a first RACH procedure on the secondary cell;
   storing a value of the second counter in a second variable when successfully completing the first RACH procedure on the secondary cell of the network; and
   reporting the second number stored in the second variable to the network to indicate the amount of random access preambles which have been sent for the last successfully completed first RACH procedure on the secondary cell of the network.

8. The method of claim 5, wherein the user equipment reports the first number and the second number to the network after receiving an information request message for a RACH report.

9. The method of claim 8, wherein the user equipment reports the first number and the second number to the network by transmitting an information response message containing the first number and the second number to the network.

10. A method of handling random access channel (RACH) procedures for a user equipment in a wireless communication system, wherein the user equipment has performed at least one first RACH procedure on a secondary cell of a network of the wireless communication system, the method comprising:
   reporting a number to the network to indicate the amount of random access preambles which have been sent for a last successfully completed second RACH procedure on a primary cell of the network.

11. The method of claim 10, wherein the step of reporting the number to the network to indicate the amount of random access preambles which have been sent for the last successfully completed second RACH procedure on the primary cell of the network comprises:

setting a counter to count the amount of random access preambles sent by a media access control (MAC) layer when trying to initiate a second RACH procedure on the primary cell;

storing a value of the counter in a variable when successfully completing the second RACH procedure on the primary cell of the network; and reporting the number stored in the variable to the network to indicate the amount of random access preambles which have been sent for the last successfully completed second RACH procedure on the primary cell of the network.

12. The method of claim 10, wherein the user equipment reports the number to the network after receiving an information request message for a RACH report.

13. The method of claim 12, wherein the user equipment reports the number to the network by transmitting an information response message containing the number to the network.

* * * * *